US 6,561,594 B1

(12) United States Patent
Lin

(10) Patent No.: US 6,561,594 B1
(45) Date of Patent: May 13, 2003

(54) WHEEL SHAFT STRUCTURE OF MONOCYCLE

(76) Inventor: Kuen Chyr Lin, No. 1, Alley 16, Lane 40, Jinn Te Rd., Taichung (TW)

( * ) Notice: Subject to any disclaimer, the term of this patent is extended or adjusted under 35 U.S.C. 154(b) by 0 days.

(21) Appl. No.: 10/077,707

(22) Filed: Feb. 15, 2002

(51) Int. Cl.[7] .......................... B60B 35/00; A63G 25/00
(52) U.S. Cl. ..................... 301/124.2; 280/205; 180/252
(58) Field of Search ................. 301/105.1, 109, 301/110, 110.5, 124.1, 124.2, 125; 180/21, 252, 253, 254, 255, 256; 280/205

(56) References Cited

U.S. PATENT DOCUMENTS

| 3,083,036 A | * | 3/1963 | Cornell, III et al. ........ 280/205 |
| 3,948,333 A | * | 4/1976 | van Lent .................... 180/116 |
| 4,194,751 A | * | 3/1980 | Shinmura .............. 280/11.201 |
| 5,199,727 A | * | 4/1993 | Lai .......................... 280/11.19 |
| 5,314,034 A | * | 5/1994 | Chittal ........................ 180/21 |
| 5,868,413 A | * | 2/1999 | Cabrera ...................... 280/205 |
| 5,950,784 A | * | 9/1999 | Yang ........................... 192/64 |
| 6,270,438 B1 | * | 8/2001 | Liao ........................... 180/207 |
| 6,386,644 B2 | * | 5/2002 | Chen ........................... 192/64 |

* cited by examiner

*Primary Examiner*—S. Joseph Morano
*Assistant Examiner*—Long Nguyen

(57) ABSTRACT

A wheel shaft structure of a monocycle includes a wheel rim, and a shaft assembly mounted in a center of the wheel rim. The shaft assembly includes a wheel shaft passed through the wheel rim, two opposite single-direction bearings symmetrically mounted on the wheel shaft and received in the central hole of the wheel rim, and two opposite double-direction bearings symmetrically mounted on the wheel shaft and received in the central hole of the wheel rim.

3 Claims, 5 Drawing Sheets

WHEEL SHAFT STRUCTURE OF MONOCYCLE

BACKGROUND OF THE INVENTION

1. Field of the Invention

The present invention relates to a wheel shaft structure of a monocycle, and more particularly to a wheel shaft structure of a monocycle, wherein the wheel shaft structure may be operated conveniently, thereby facilitating maintenance and thereby saving time and manual work.

2. Description of the Related Art

A conventional monocycle in accordance with the prior art has a complicated structure, thereby increasing cost of fabrication. In addition, the conventional monocycle cannot be assembled conveniently, thereby consuming time and manual work. Further, the conventional monocycle does not have a brake effect, thereby easily causing injury to the rider.

SUMMARY OF THE INVENTION

The present invention has arisen to mitigate and/or obviate the disadvantage of the conventional monocycle.

The primary objective of the present invention is to provide a wheel shaft structure of a monocycle, wherein the wheel shaft structure may be operated conveniently, thereby facilitating maintenance and thereby saving time and manual work.

Another objective of the present invention is to provide a wheel shaft structure of a monocycle, wherein the wheel shaft structure may be assembled easily, conveniently and rapidly.

A further objective of the present invention is to provide a wheel shaft structure of a monocycle, wherein the wheel shaft structure has a simple construction, thereby saving cost of fabrication.

A further objective of the present invention is to provide a wheel shaft structure of a monocycle, wherein the wheel shaft structure has a braking effect.

In accordance with the present invention, there is provided a wheel shaft structure of a monocycle, comprising a wheel rim, and a shaft assembly mounted in a center of the wheel rim, wherein:

the shaft assembly includes a wheel shaft passed through the wheel rim, two opposite single-direction bearings symmetrically mounted on the wheel shaft and received in the central hole of the wheel rim, and two opposite double-direction bearings symmetrically mounted on the wheel shaft and received in the central hole of the wheel rim.

Preferably, the wheel shaft of the shaft assembly is passed through a central hole of the wheel rim.

Preferably, the two opposite single-direction bearings are located in the two opposite double-direction bearings.

Further benefits and advantages of the present invention will become apparent after a careful reading of the detailed description with appropriate reference to the accompanying drawings.

DETAILED DESCRIPTION OF THE INVENTION

Figure 1:
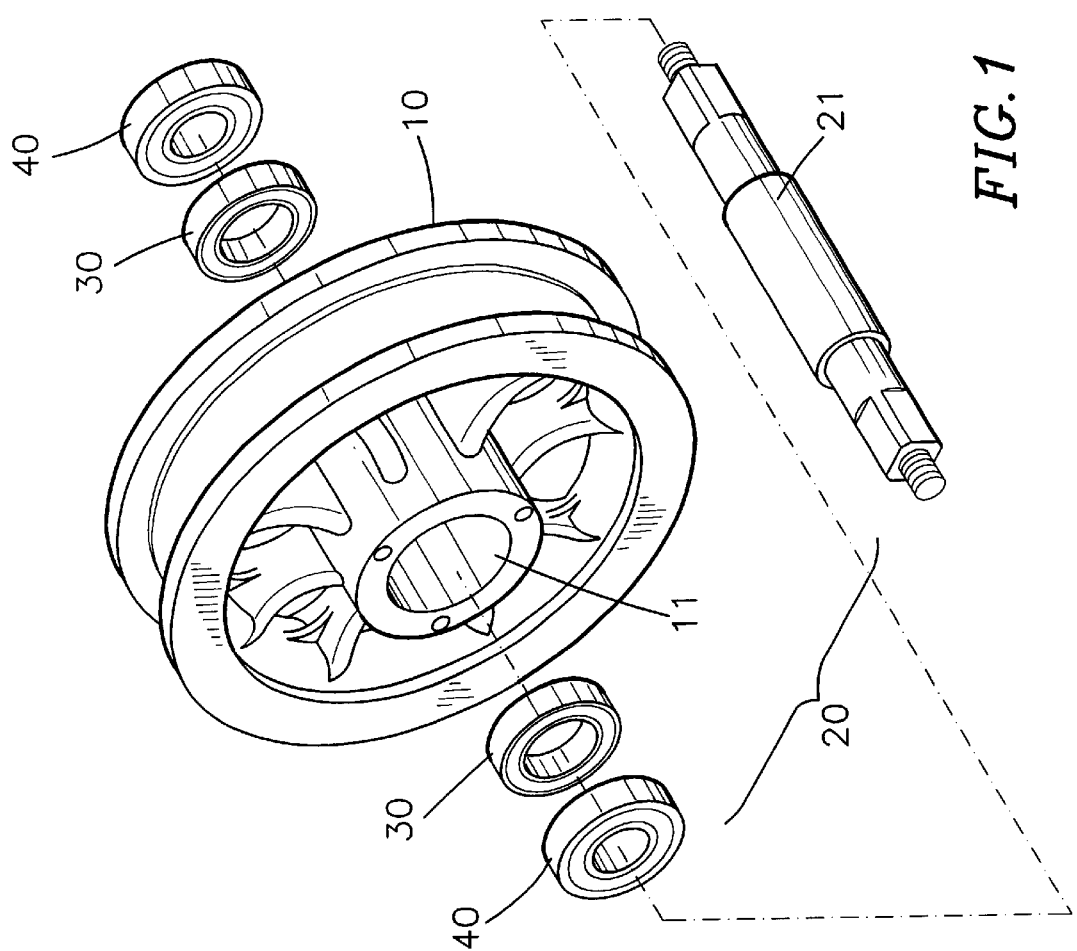
FIG. 1 is an exploded perspective view of a wheel shaft structure of a monocycle in accordance with a preferred embodiment of the present invention.
Figure 2:
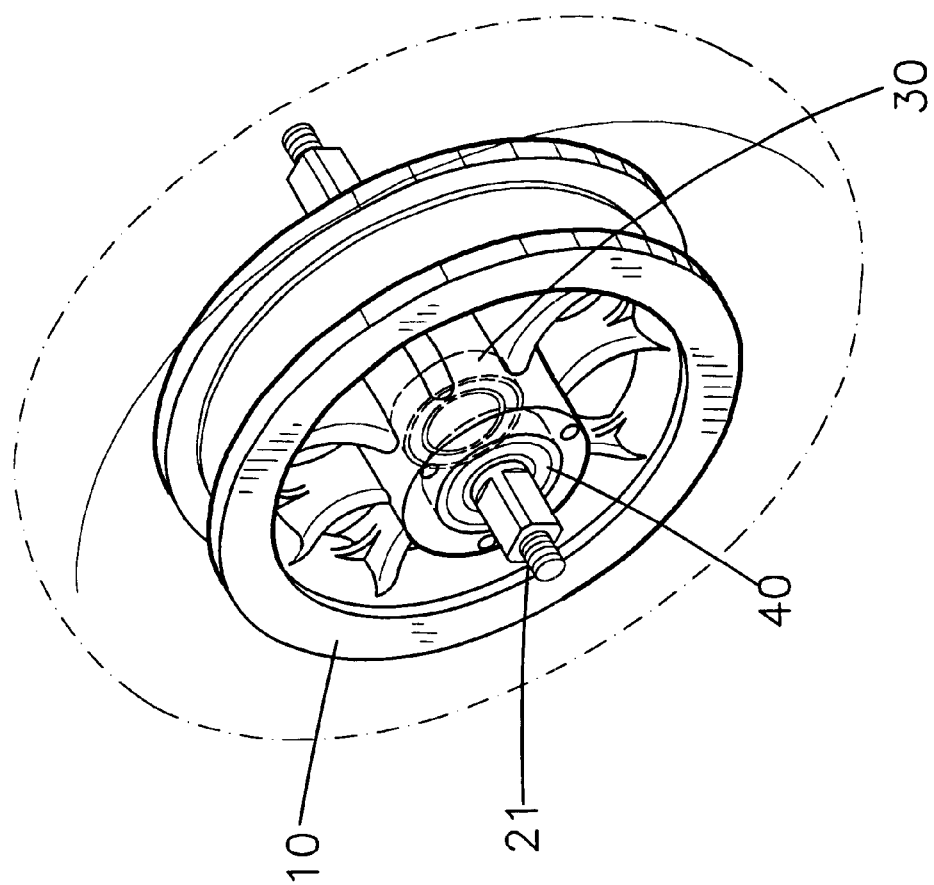
FIG. 2 is a perspective assembly view of the wheel shaft structure of a monocycle as shown in FIG. 1.

Referring to the drawings and initially to FIGS. 1 and 2, a wheel shaft structure of a monocycle in accordance with a preferred embodiment of the present invention comprises a wheel rim 10, and a shaft assembly 20 mounted in a center of the wheel rim 10.

The shaft assembly 20 includes a wheel shaft 21 passed through a central hole 11 of the wheel rim 10, two opposite single-direction bearings 30 symmetrically mounted on the wheel shaft 21 and received in the central hole 11 of the wheel rim 10, and two opposite double-direction bearings 40 symmetrically mounted on the wheel shaft 21 and received in the central hole 11 of the wheel rim 10. Preferably, the two opposite single-direction bearings 30 are located in the two opposite double-direction bearings 40.

In assembly, referring to FIGS. 2–5 with reference to FIG. 1, the two opposite single-direction bearings 30 are symmetrically mounted on an inner side of the wheel shaft 21, and the two opposite double-direction bearings 40 are symmetrically mounted on an outer side of the wheel shaft 21, thereby constructing the shaft assembly 20. Then, the shaft assembly 20 is mounted in the central hole 11 of the wheel rim 10, thereby constructing the wheel shaft structure of a monocycle in accordance with a preferred embodiment of the present invention. Then, the two ends of the wheel shaft 21 are combined with a crank set 50, so that the rider may tread the crank set 50 to drive and rotate the wheel shaft 21.

Figure 3:
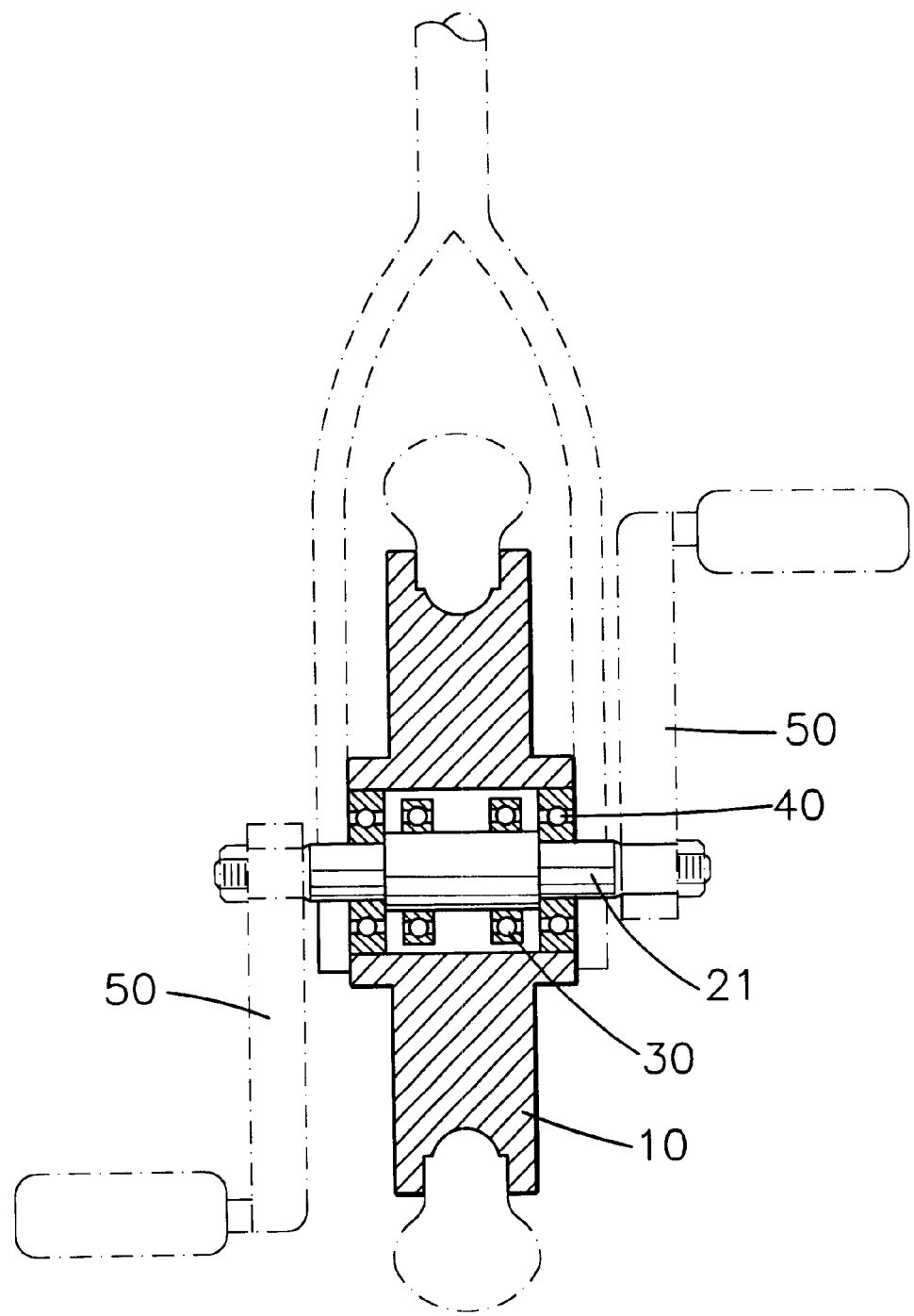
FIG. 3 is a side plan cross-sectional assembly view of the wheel shaft structure of a monocycle taken as shown in FIG. 2.
Figure 4:
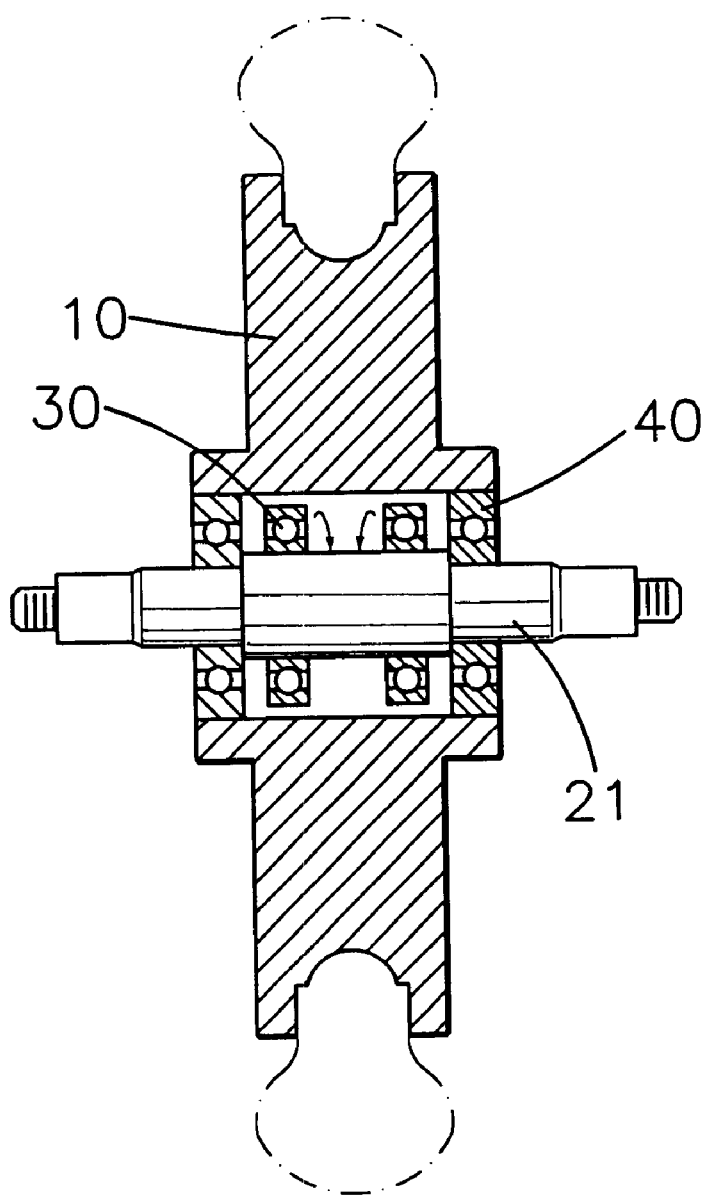
FIG. 4 is a schematic operational view of the wheel shaft structure of a monocycle as shown in FIG. 3 in use.
Figure 5:
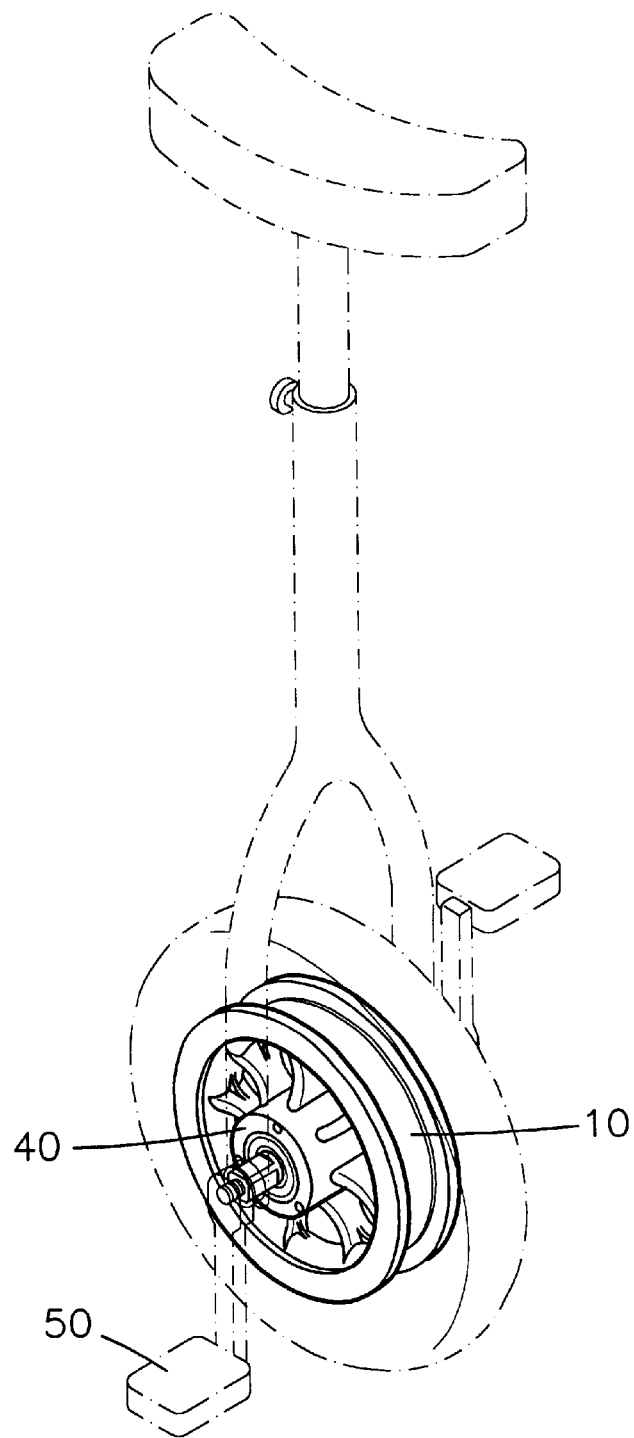
FIG. 5 is a schematic operational view of the wheel shaft structure of a monocycle as shown in FIG. 2 in use.

In operation, referring to FIGS. 4 and 5 with reference to FIGS. 2 and 3, when the rider treads the crank set 50 to drive and rotate the wheel shaft 21 along a normal or forward direction, the wheel shaft 21 may be rotated forward conveniently. On the contrary, when the rider treads the crank set 50 to drive and rotate the wheel shaft 21 along a reverse or backward direction, the wheel shaft 21 is limited by the two opposite single-direction bearings 30, so that the wheel shaft 21 cannot be rotated backward, thereby producing a braking effect, thereby preventing the wheel from being rotated reversely.

Thus, the wheel shaft 21 may be rotated forward conveniently, and may be braked when being rotated backward.

Accordingly, the wheel shaft structure of a monocycle in accordance with a preferred embodiment of the present invention has the following advantages.

What is claimed is:

1. A wheel shaft structure of a monocycle, comprising a wheel rim, and a shaft assembly mounted in a center of the wheel rim, wherein:

the shaft assembly includes a wheel shaft passed through the wheel rim and having two ends each combined with a crank set of the monocycle, so that the wheel shaft is driven and rotated by the crank set of the monocycle, two opposite single-direction bearings symmetrically mounted on the wheel shaft and received in a central hole of the wheel rim, and two opposite double-direction bearings symmetrically mounted on the wheel shaft and received in the central hole of the wheel rim.

2. The wheel shaft structure of a monocycle in accordance with claim 1, wherein the wheel shaft of the shaft assembly is passed through the central hole of the wheel rim.

3. The wheel shaft structure of a monocycle in accordance with claim 1, wherein the two opposite single-direction bearings are symmetrically mounted on an inner side of the wheel shaft, and the two opposite double-direction bearings are symmetrically mounted on an outer side of the wheel shaft.

* * * * *